US012688470B2

(12) United States Patent
McSpadden, II et al.

(10) Patent No.: US 12,688,470 B2
(45) Date of Patent: Jul. 21, 2026

(54) COMPUTERIZED TRAVEL ITINERARY RECOMMENDATION TOOL AND METHOD USING CONTEXTUAL INFORMATION

(71) Applicant: Sabre GLBL Inc., Southlake, TX (US)

(72) Inventors: Mark Alan McSpadden, II, Coppell, TX (US); Philip Joshua Likens, Lantana, TX (US); Kenneth Alan Tabor, Coppell, TX (US); Eun Ji Seo, Dallas, TX (US)

(73) Assignee: Sabre GLBL Inc., Southlake, TX (US)

( * ) Notice: Subject to any disclaimer, the term of this patent is extended or adjusted under 35 U.S.C. 154(b) by 273 days.

(21) Appl. No.: 16/219,234

(22) Filed: Dec. 13, 2018

(65) Prior Publication Data

US 2019/0228347 A1     Jul. 25, 2019

Related U.S. Application Data

(60) Provisional application No. 62/649,903, filed on Mar. 29, 2018, provisional application No. 62/621,998, (Continued)

(51) Int. Cl.
*G06Q 10/02* (2012.01)
*G01C 21/34* (2006.01)
(Continued)

(52) U.S. Cl.
CPC ........... *G06Q 10/02* (2013.01); *G01C 21/343* (2013.01); *G01C 21/3617* (2013.01); *G06F 16/90324* (2019.01); *G06Q 50/14* (2013.01)

(58) Field of Classification Search
CPC ...... G06Q 10/02; G06Q 10/025; G06Q 10/03; G06Q 50/14; G01C 21/343; G01C 21/3617
See application file for complete search history.

(56) References Cited

U.S. PATENT DOCUMENTS

| | | | | |
|---|---|---|---|---|
| 2015/0339598 A1* | 11/2015 | Lulla | .................. | G06Q 30/0601 |
| | | | | 705/5 |
| 2016/0239765 A1* | 8/2016 | Pasero | .............. | G06F 16/24578 |
| 2018/0053121 A1* | 2/2018 | Gonzalez | .............. | G06Q 30/02 |

OTHER PUBLICATIONS

Declaration of Mark Alan McSpadden II—Jan. 6, 2019.

* cited by examiner

*Primary Examiner* — George Chen
*Assistant Examiner* — Duane N. Moore
(74) *Attorney, Agent, or Firm* — Baker Botts L.L.P.

(57) ABSTRACT

A computerized travel itinerary recommendation tool includes a traveler monitor, a contextual information parser, and a recommendation engine. The traveler monitor obtains traveler preference information associated with a traveler. The traveler preference information indicates one or more travel criteria for a trip. Travel criteria comprises one or more parameters of travel products available for the trip. The contextual information parser infers one or more travel criteria from contextual information obtained for the trip. The contextual information is information that does not include any travel criterion. The recommendation engine determines a recommended travel itinerary for the trip to the traveler based on the travel preference information and the contextual information. The recommendation engine further causes a display of the recommended travel itinerary to the traveler. Displaying the recommended travel itinerary allows the traveler to review travel criteria associated with the recommended travel itinerary and select the recommended travel itinerary for booking the trip.

18 Claims, 4 Drawing Sheets

Related U.S. Application Data filed on Jan. 25, 2018, provisional application No. 62/621,986, filed on Jan. 25, 2018.

(51) Int. Cl.

| | | |
|---|---|---|
| *G01C 21/36* | (2006.01) | |
| *G06F 16/9032* | (2019.01) | |
| *G06Q 50/14* | (2012.01) | |

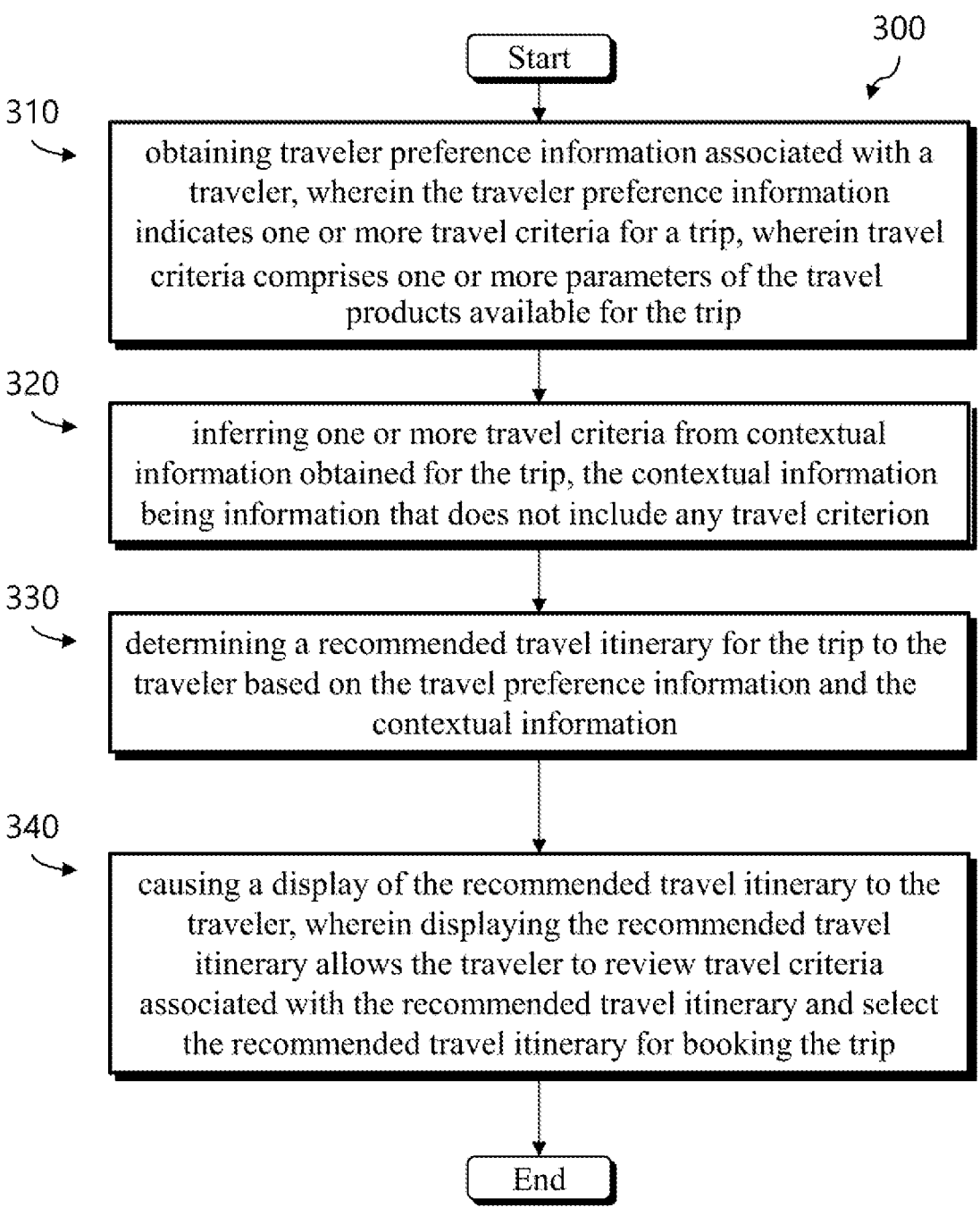

300

Start

310 obtaining traveler preference information associated with a traveler, wherein the traveler preference information indicates one or more travel criteria for a trip, wherein travel criteria comprises one or more parameters of the travel products available for the trip

320 inferring one or more travel criteria from contextual information obtained for the trip, the contextual information being information that does not include any travel criterion

330 determining a recommended travel itinerary for the trip to the traveler based on the travel preference information and the contextual information

340 causing a display of the recommended travel itinerary to the traveler, wherein displaying the recommended travel itinerary allows the traveler to review travel criteria associated with the recommended travel itinerary and select the recommended travel itinerary for booking the trip

End

*FIG. 3*

COMPUTERIZED TRAVEL ITINERARY RECOMMENDATION TOOL AND METHOD USING CONTEXTUAL INFORMATION

RELATED APPLICATIONS

This application claims the benefit of Provisional Application Ser. No. 62/621,986, filed on Jan. 25, 2018 and entitled "DUELLING OFFERS," Provisional Application Ser. No. 62/649,903, filed on Mar. 29, 2018 and entitled "DUELLING OFFERS," and Provisional Application Ser. No. 62/621,998, filed on Jan. 25, 2018 and entitled "TRIP CONTEXT," the contents of which are incorporated by reference herein in their entirety.

TECHNICAL FIELD

Certain embodiments of the present disclosure relate, in general, to computerized shopping and booking for travel products and, more particularly, a computerized travel itinerary recommendation tool using contextual information.

BACKGROUND

Travel service providers, such as airlines, hoteliers, and travel agents, create and make available for purchase different travel products. For example, an airline may offer flights between cities on certain days at different times and create travel products associated with those flights. In this example, the travel products may include airline tickets for a flight from DFW to O'Hare for different seats on the plane having different options, e.g., levels of service, baggage options, cancellation/transferability conditions, etc. Similarly, hotels may create different travel products based on the different rooms and services available at their hotels. With the increased pressure to differentiate and more specifically target consumers, travel service providers are continually creating different types of travel products and variations of existing travel products by providing more consumer options and customization. As a result, a traveler attempting to book a trip may have an inordinate amount of travel products to choose from. Existing filtering techniques for narrowing down available flights or hotels based on explicit travel criteria, e.g., limiting to a specific airline or seat class, are insufficient to provide a manageable set of options from which to choose. As additional options and travel product dimensions are introduced, existing filtering techniques will become even more inept at providing the traveler with options that coincide with the traveler's desired travel plans.

SUMMARY

According to an embodiment, a computerized travel booking system includes a first server, and a travel itinerary recommendation tool. The first server stores information associated with travelers previously using the travel booking system. The travel itinerary recommendation tool is communicatively coupled to the first server, one or more second servers, and a client device. The one or more second servers store one or more travel products available for booking through the travel booking system. The travel itinerary recommendation tool includes a traveler monitor, a contextual information parser, and a recommendation engine. The traveler monitor obtains traveler preference information associated with a traveler from one or more of the first server and the client device. The traveler preference information indicates one or more travel criteria for a trip. The one or more travel criteria include one or more parameters of the travel products available for booking for the trip. The contextual information parser infers one or more travel criteria from contextual information obtained for the trip. The contextual information is information that does not include any travel criterion. The recommendation engine determines a recommended travel itinerary for the trip to the traveler based on the travel preference information and the contextual information. The recommendation engine also causes a display of the recommended travel itinerary to the traveler at the client device. Displaying the recommended travel itinerary allows the traveler to review travel criteria associated with the recommended travel itinerary and select the recommended travel itinerary for booking the trip using the client device.

According to another embodiment, a computerized method is provided for use in a travel itinerary booking system. The method includes obtaining traveler preference information associated with a traveler. The traveler preference information indicates one or more travel criteria for a trip. Travel criteria comprises one or more parameters of the travel products available for the trip. The method further includes inferring one or more travel criteria from contextual information obtained for the trip. The contextual information is information that does not include any travel criterion. The method further includes determining a recommended travel itinerary for the trip to the traveler based on the travel preference information and the contextual information. The method further includes causing a display of the recommended travel itinerary to the traveler, Displaying the recommended travel itinerary allows the traveler to review travel criteria associated with the recommended travel itinerary and select the recommended travel itinerary for booking the trip. Steps of the method may be carried out by one or more computers.

According to yet another embodiment, a travel itinerary recommendation tool includes a traveler monitor, a contextual information parser, and a recommendation engine. The traveler monitor obtains traveler preference information associated with a traveler. The traveler preference information indicates one or more travel criteria for a trip. Travel criteria comprises one or more parameters of travel products available for the trip. The contextual information parser infers one or more travel criteria from contextual information obtained for the trip. The contextual information is information that does not include any travel criterion. The recommendation engine determines a recommended travel itinerary for the trip to the traveler based on the travel preference information and the contextual information. The recommendation engine further causes a display of the recommended travel itinerary to the traveler. Displaying the recommended travel itinerary allows the traveler to review travel criteria associated with the recommended travel itinerary and select the recommended travel itinerary for booking the trip.

Certain embodiments disclosed herein may provide one or more technical advantages over existing techniques in providing travel options to a traveler. As an example, certain embodiments provide recommended travel itineraries to travelers using contextual information that is not directly able to limit desired travel products. For example, a travel itinerary recommendation tool may be provided that infers travel criteria from contextual information specific to the traveler and his particular trip and based on the inferences, provide a more accurate and useful recommendation to the traveler. As another example, certain embodiments use a generated data structure representing the traveler's preferences to provide the recommended travel itinerary. In particular, some embodiments apply the traveler preference data structure to available travel products and determine which of the travel products most closely matches the traveler's preferences. The data structure may provide an easier manner in which to compare the available travel products while allowing flexibility and customization with contextual information. Certain embodiments may have none, some, or all of the above-recited advantages. Other advantages may be readily apparent to one having skill in the art in light of the present disclosure.

BRIEF DESCRIPTION OF THE DRAWINGS

For a more complete understanding of the disclosed embodiments and their features and advantages, reference is now made to the following description, taking in conjunction with the accompanying drawings, in which:

FIG. 3 illustrates a flowchart diagram of an example method for recommending a travel itinerary to a traveler, in accordance with certain embodiments.

DETAILED DESCRIPTION

As described above, existing filtering techniques are inadequate to deal with the ever-increasing number and variety of travel products shopped for by travelers. In particular, filtering still requires the traveler to sift through the remaining options to determine which is the best itinerary. This may prove a daunting task if hundreds or more options still remain. In some instances, the traveler may begin over filtering in an effort to reduce the number of options. This may result in, however, the removal of itineraries that the traveler may prefer. Similarly, the traveler may attempt to add and remove filters to generate different lists of travel itineraries. But, this results in the traveler having to compare and crosscheck options across multiple lists, some of which may not be available at all times, e.g., if the traveler uses the same browsing tab for the different filtering choices. Accordingly, what is desired is a travel booking system and methods that can recommend one or more preferred itineraries considering the traveler's preferences across various dimensions in a wholistic manner. Described herein are various embodiments of systems, methods and apparatuses that may address one or more of the problems described herein in recommending travel itineraries to travelers.

Figure 1A:
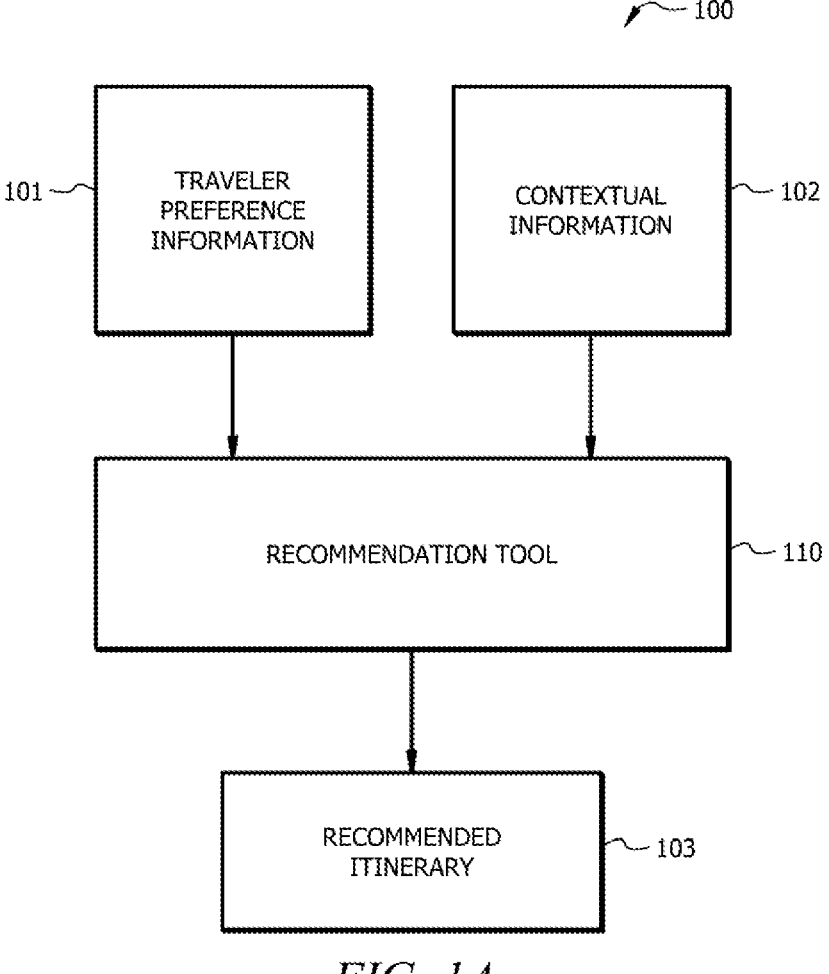
FIGS. 1A and 1B illustrate an example travel booking system, in accordance with certain embodiments.
Figure 1B:
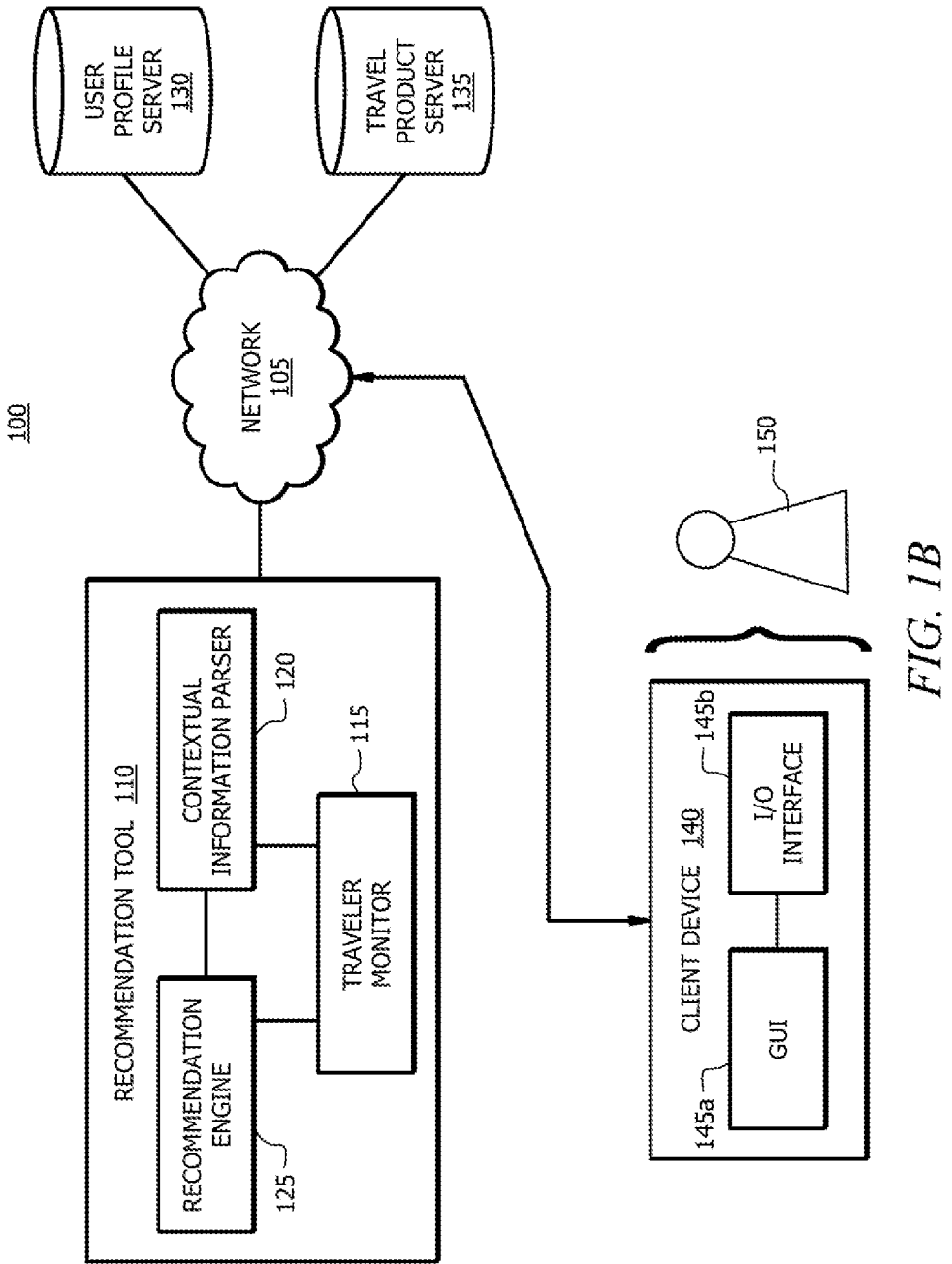
Figure 2:
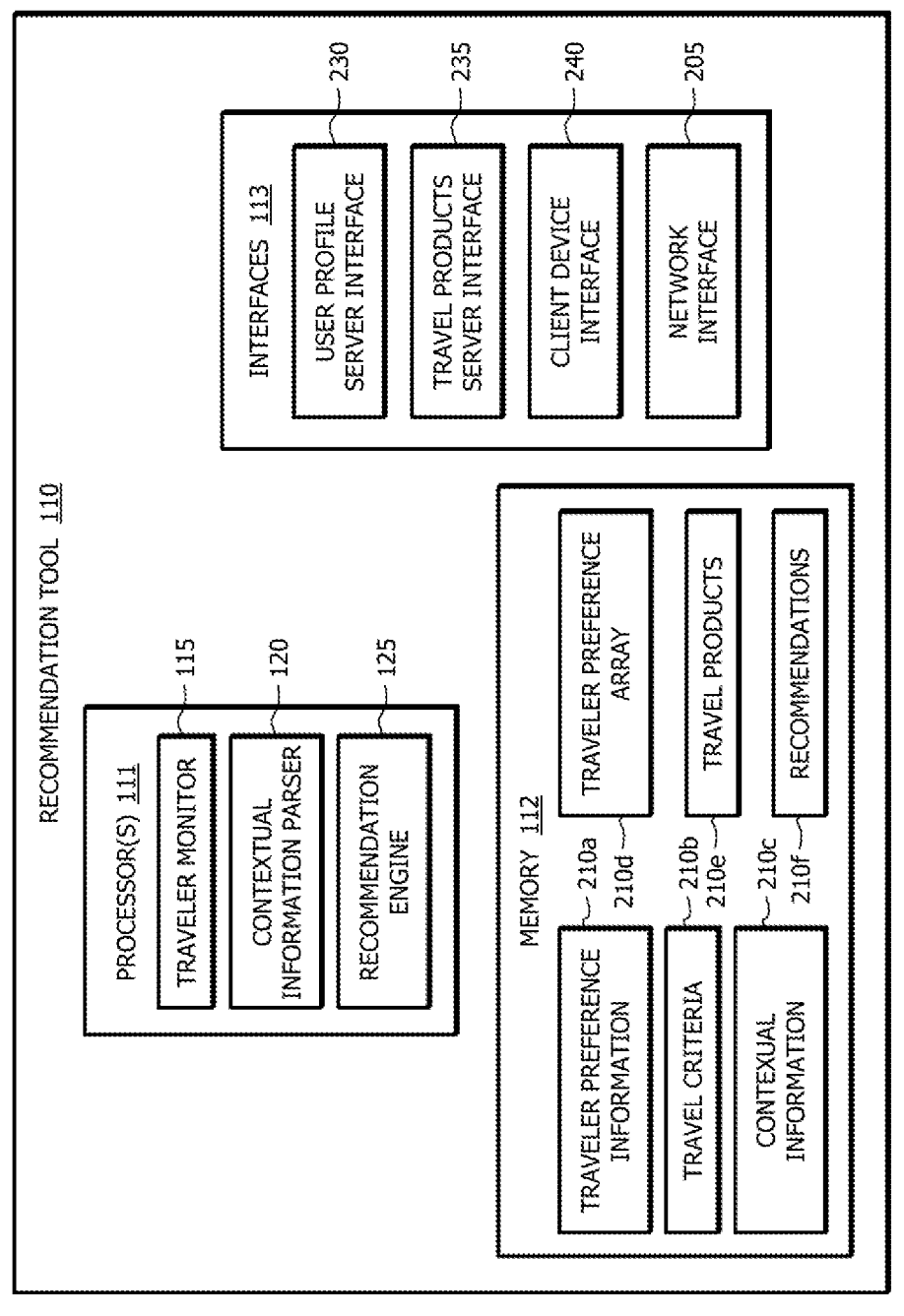
FIG. 2 illustrates an example recommendation engine, in accordance with certain embodiments.

As detailed herein, FIGS. 1A and 1B show example travel booking system for booking or reserving travel products. FIG. 2 shows an implementation of a recommendation tool used to recommend a travel itinerary to a traveler. FIG. 3 illustrates an example method for recommending a travel itinerary to a traveler. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

FIG. 1A illustrates an example travel booking system 100, in accordance with certain embodiments. Travel booking system 100 provides a recommended itinerary 103 (or a selection of recommended itineraries) to a user using recommendation tool 110. Recommendation tool 110 obtains traveler preference information 101 and contextual information 102. For example, one or more or a portion of one or more of traveler preference information 101 and contextual information 102 may be obtained from the user themselves, based on information provided by the user, and/or based on other sources. Traveler preference information 101 may include one or more travel criteria that include parameters associated with travel products, e.g., a price, a seat location, a hotel room type, a departure time-of-day, etc. In contrast, contextual information 102 may be any information that does not include any travel criterion. Contextual information 102 may provide additional information about the user's travel preferences without explicitly providing parameters on which to compare travel products.

Recommendation tool 110 may utilize traveler preference information 101 and contextual information 102 to provide recommended itinerary. For example, recommendation tool 110 may identify one or more travel criteria included in traveler preference information 101 and infer one or more travel criteria from contextual information 102. These identifications may be aggregated together by recommendation tool 110 into a model or selection system or method that can be used to rank or choose one or more recommended itineraries based on the available travel products. For example, recommendation tool 110 may compare the available travel products to the generated model to select recommended itinerary 103 to display to the user. As a result, travel booking system 100 may provide recommended itinerary 103 using traveler preference information 101 and contextual information 102.

This process may result in dynamically-generated, trip-specific preferences being used to determine recommended itinerary 103. For example, contextual information 102 may be obtain in response to the user initiating a new trip search. Further, contextual information 102 may be applied only to the relevant trip, and not carried over from previous trips or searches. This type of information may be more useful in providing accurate recommendations than the more general preferences that may be obtained from a user profile of the user. While travel booking system 100 may use the general preferences of the user, those general preferences may be different from the preferences reflected in contextual information 102 specific to the current trip. For example, the user may generally prefer the lowest cost flights, regardless of airline or other amenities, but the user's circumstances may be different for this particular trip (e.g., the user may have recently suffered a back injury and contextual information 102 reflects a higher preference for more expensive, but more comfortable flights or if user is planning a last-minute trip for business, he may be less sensitive to prices and more worried about travel times and connections). This may be especially useful in providing recommendations for travelers that book a diversity of trips, which may result in unspecific general preferences. Accordingly, various embodiments of systems and methods disclosed herein utilize dynamic and trip-specific user context information to provide accurate recommendations for travel products.

FIG. 1B illustrates an example implantation of travel booking system 100, in accordance with certain embodiments. Travel booking system 100 may include a recommendation tool 110, a user profile server 130, a travel products server 135 and a client device 140. Client device 140 may be a separate device from travel booking system 100. Travel booking system 100 may provide travel booking services to a traveler 150 through his client device 140. For example, traveler 150 may access travel booking system 100 through client device 140 to search for, review, and select one or more travel products to book. Travel booking system 100 may address one or more of the problems described previously by providing a recommended itinerary to traveler 150.

Travel booking system 100 may use recommendation tool 110 to provide one or more recommended itineraries to display to traveler 150 using client device 140. For example, recommendation tool 110 may first obtain traveler preference information 101 about traveler 150 from user profile server 130 and/or client device 140 and available travel products from travel products server 135 relevant to traveler 150's trip (e.g., based on the identity of traveler 150 and/or origin, destination, and dates of the trip). Recommendation tool 110 may then further obtain contextual information 102 and infer travel criteria based on contextual information 102. Based on the travel preference information and contextual information, recommendation tool 110 may determine traveler 150's preferences and use that to recommend one or more itineraries that best fit with traveler 150's preferences.

The recommended itineraries may be displayed on client device 140 such that traveler 150 may view the details of the itineraries and select one of the itineraries to book. If traveler 150 selects an itinerary to book, travel booking system 100 may be further configured to book the itinerary using existing techniques known to persons having ordinary skill in the art. As a result, travel booking system 100 may provide a recommended itinerary that reflects the preferences of traveler 150. As further detailed below, travel booking system 100 may include various embodiments and features that may enhance the recommendation of travel products to traveler 150.

For example, recommendation tool 110 may include one or more subcomponents that may carry out one or more functions or intermediary steps in providing the recommended itinerary to traveler 150. In certain embodiments, recommendation tool 110 includes traveler monitor 115, contextual information parser 120, and recommendation engine 125. Together, these components of recommendation tool 110 may determine a recommended itinerary to display to traveler 150 using contextual information. In particular, in certain embodiments, traveler monitor 115 is configured to obtain traveler preference information 101 associated with traveler 150. Traveler preference information 101 may indicate one or more travel criteria for a trip. For example, traveler 150 may indicate origin, destination, and travel dates for a flight. Each of these elements may be travel criteria. For example, each of these elements may include a parameter by which travel products may be filtered. Additional travel criteria may be obtained from traveler preference information 101. Using the flight example again, travel criteria may include a departure time of day, preferred flight amenities (e.g., class, leg room, snacks, WIFI, baggage, priority access, etc.), refundability, among others that are readily understood by persons having ordinary skill in the art. Each of these travel criteria may be used to filter the available travel products based on the more basic travel criteria, such as origin, destination, and travel dates.

Traveler monitor 115 is also configured to obtain contextual information, in certain embodiments. For example, in some embodiments, traveler 150 may generate contextual information by interacting with a travel booking system 100 including recommendation tool 110. This contextual information may not be explicitly provided by traveler 150. As an example, contextual information 102 may be obtained by observing traveler 150's behavior when interacting with travel booking system 100. In particular, this may include when traveler 150 is shopping for travel products, the location and/or weather where traveler 150 is shopping from, what does traveler 150 click on or mouse over when shopping for his trip, etc. In some embodiments, contextual information 102 is provided explicitly or obtained using explicitly provided information. As one example, contextual information 102 may be provided in response to a prompt, e.g., "Travel with team to business conference." in response to a query of "What is the purpose of your trip?" As another example, contextual information 102 may be obtained using a travel criteria or other piece of information provided by traveler 150. Specifically, the destination of the trip may be used to obtain contextual information of the expected weather at the destination, which may be used in providing a recommended itinerary. Contextual information 102 or associated information may be obtained from client device 140, e.g., based on traveler 150's input, or an external system storing the relevant contextual information. In this manner, traveler monitor 115 may be configured to obtain contextual information 102 in addition to traveler preference information 101.

As alluded to above, contextual information 102 may take a wide array of forms. For example, there may be different categories or types of contextual information obtained and used by recommendation tool 110. Contextual information 102 may include information associated with the location of the traveler or the time at which the traveler is seeking a travel itinerary for the trip, in certain embodiments. This may indicate whether traveler 150 is shopping for business or pleasure travel, whether traveler 150 is booking last minute, whether traveler 150 is located in a city that has worse weather than the proposed destination of his travel, etc. In certain embodiments, contextual information 102 includes information associated with a destination of the trip. For example, this category of information may include the region of the destination, the characteristics of the destination (e.g., a large city or a beach town), and associated climate and weather information. Another category of contextual information may include a reason for the trip or an indication that the traveler is travelling with a group or alone. Such contextual information may inform different aspects of the travel criteria. For example, if traveler 150 is travelling for business alone for a meeting, that may indicate the traveler's preference for a direct flight at certain times of the day and accommodations near the airport or meeting location. As another example, if contextual information 102 includes an indication that traveler 150 is traveling to a conference on their own budget, a preference for a cheap flight with any number of connections arriving any time the day before the start of the conference may be inferred. In some embodiments, contextual information 102 may include information associated with a state of mind of the traveler. The state of mind of the traveler may be inferred based on other contextual information, such as how traveler 150 interacts with travel booking system (e.g., whether traveler 150 is just browsing or is motivated to book travel immediately) and traveler's 150 past experiences (e.g., based on ratings or reviews provided by traveler 150).

In addition to travel criteria provided from traveler preference information 101, contextual information may be obtained and used by recommendation tool 110 to provide a more accurate and tailored travel itinerary recommendation to traveler 150. Contextual information parser 120 is configured to infer one or more travel criteria from contextual information obtained for the trip, in certain embodiments. For example, contextual information, such as that obtained by traveler monitor 115 and/or other components of recommendation tool 110, may enhance the ability of recommendation tool 100 to provide a more targeted and wholistic recommendation for travel products for traveler 150's trip. Contextual information may differ from travel criteria as it does not directly relate or include any parameters of the various travel products. For example, contextual information may be information that does not include any travel criterion. As such, conventional search and filtering techniques typically ignore this type of information or use it for unrelated reasons, e.g., statistics gathering. While contextual information may not be as readily applicable to determine a recommended itinerary, contextual information parser 120 may relate it to associated travel criteria, which may be used in various manners to provide the recommended travel itinerary using recommendation engine 125.

Contextual information parser 120 may parse contextual information in various ways. Contextual information parser 120 may have stored or otherwise obtain one or more relations between a type of contextual information and one or more travel criteria, according to certain embodiments. For example, contextual information indicating that the purpose of the trip is for business and the travel dates include a Monday departure and a Friday return may be related to travel criteria such as time of day departure/return, seat class, refundability/flight change flexibility, and a price sensitivity. In particular, the example contextual information may indicate that the traveler intends to arrive early enough to work on Monday and leave late enough to finish work on Friday. Further, the business purpose may indicate that a business or first-class seat is preferred and that the trip may have a higher potential of flight change, e.g., due to a change in the work schedule. This may also indicate that there is less price sensitivity, especially if the business traveler is not paying of the trip himself or will be reimbursed. Although merely one example, this illustrates how contextual information 102, as parsed by contextual information parser 120, may provide additional preference information about traveler 150's trip.

Contextual information parser 120 uses obtained information about the relationship between the contextual information 102 and one or more travel criteria to infer travel criteria, in certain embodiments. The obtained relationship information may be generated based on prior trips booked by traveler 150 and/or other users of travel booking system 100, in certain embodiments. For example, travel booking system 100 may collect and store data based on past interactions from its users. This may include storing obtained preference information and contextual information for each trip booked using travel booking system 100. When a trip is booked, travel booking system 100 may store not only the associated contextual information and preference information, but also how previously obtained contextual information is correlated to the itinerary actually booked, in some embodiments. In a more complex analysis, a stronger correlation may be adduced when the booked itinerary and the travel criteria from the preference information is loosely linked, e.g., the preference information is not very strongly related to the chosen itinerary or does not explain one or more attributes of the chosen itinerary. Travel booking system 100 may aggregate all such correlations and relationship information for use by recommendation tool 110. For example, the information may allow contextual information parser 120 to more easily relate contextual information 102 to associated travel criteria, and optionally, assign weighting factors to the inferences. In this manner, recommendation tool 110 may become more accurate and efficient over time.

Recommendation tool 110 may combine the travel preference information and contextual information to provide a recommended travel itinerary. Recommendation engine 125 may apply the user preference model to a set of travel products conforming to the trip criteria, in certain embodiments. For example, recommendation engine 125 may compare travel criteria from traveler preference information 101 and inferred from contextual information 102 to the set of travel products that are available for traveler 150's trip. Based on the comparison, recommendation engine 125 may cause the display of one or more recommended travel itineraries. The recommended travel itinerary may be the travel product that most closely matches the user preferences based on the user preference model. Recommendation engine 125 causes the display of the recommended travel itinerary on client device 140, in certain embodiments. This may enable traveler 150 to review travel criteria associated with the recommended travel itinerary and select the recommended travel itinerary for booking the trip, e.g., using travel booking system 100.

Recommendation engine 125 may determine the recommended travel itinerary using the preference information and contextual information using various techniques. Recommendation engine 125 may generate a traveler preference data structure for the trip to determine the recommended travel itinerary, in accordance with certain embodiments. For example, recommendation engine 125 may create an array or other suitable data structure in which to store preference values associated with different potential features or characteristics of a travel product. Such features may include, the price, inclusions of various amenities or comfort features, class type, etc. The traveler preference data structure may be based on the travel criteria indicated by traveler preference information 101 and the travel criteria inferred from contextual information 102. The array is a vector containing a dimension for each applicable searchable travel product feature, in some embodiments. For example, recommendation engine may compile the indications of particular travel criteria into a single value for each criterion and store those values in the traveler preference data structure. Each value may be based on the aggregation and compilation of indications of the travel criteria from both traveler preference information 101 and contextual information 102. In some embodiments, the indications from contextual information 102 may be weaker than explicitly indicated travel criteria. The data structure may reflect this lack of certainty by applying a weighting or discounting factor when determining each travel criteria value. In particular embodiments, contextual information parser 120 may provide a certainty or relationship strength value indicating the correlation between contextual information 102 and the inferred travel criteria. Recommendation engine 125 may then use that value to discount or otherwise weight that indication when aggregating all of the information about traveler 150's trip into the traveler preference data structure.

The creation of the traveler preference data structure may be an iterative process. For example, a preliminary data structure may be generated that only reflects explicitly-provided travel criteria from traveler 150. The values of this preliminary data structure may be adjusted based on further processing of additionally-acquired travel criteria indications and contextual information parsed by contextual information parser 120. For example, for each new piece of information, recommendation engine 125 may apply a transformation function to the current iteration of the traveler preference data structure. In some embodiments, recommendation engine 125 may apply a function or matrix multiplication to the traveler preference data structure, wherein the function or matrix multiplication is based on a vector of the features or travel criteria indicated by the new information, e.g., a piece of contextual information. In this manner, traveler 150's preferences may be encoded with all available information and become clearer as traveler 150 continues to interact with travel booking system 100, leading to more accurate and useful travel itinerary recommendations.

Recommendation engine 125 is configured to determine a certainty value of the traveler 150's preference, according to certain embodiments. For example, recommendation engine 125 may associate a certainty value for each measured dimension based on the information obtained about traveler 150's trip. The certainty values may be based on the volume of information obtained and the probative nature of those pieces of information. Recommendation engine 125 may update the confidence or certainty determination in response to receiving new contextual information or other information from traveler 150. Recommendation tool 110 may utilize the certainty determination to assess how accurate it expects the recommendation to be and whether it may determine to prompt traveler 150 for additional information to bolster the knowledge of traveler 150's preferences. Accordingly, confidence information may inform the recommendation engine 125 to generate a more accurate model of preferences and ensure better recommendations for traveler 150.

The traveler preference data structure is applied to the travel products available for the trip, in certain embodiments. For example, recommendation engine 125 may apply the traveler preference data structure to determine a closest travel product of the available travel products that has the least deviation from the traveler preference data structure. Based on the comparison, recommendation engine 125 may cause the display of a recommended travel itinerary. The recommended travel itinerary may be the travel product that most closely matches the user preferences based on the user preference model.

Recommendation engine 125 determines the recommended travel itinerary by applying a function based on the user preference model to the set of available travel products, in some embodiments. For example, recommendation engine 125 may compare the user preference model as an array to the arrays representing the itineraries/travel products using a mathematical calculation. Recommendation engine 125 may select a respective travel product that represents a local extreme of a mathematical function or operator as the recommended travel itinerary. In some embodiments, recommendation engine 125 uses the Pearson Correlation Coefficient (r) to determine the recommended itinerary. For example, recommendation engine 125 may calculate r for each available itinerary/travel product and choose the itinerary/travel product with the greatest value of r as the recommended itinerary. In some embodiments, recommendation engine 125 uses the measure of Cosine similarity to determine which of the available itineraries to select as the recommended itinerary to preset to traveler 150. Any other suitable measure or preference ranking may be used by recommendation engine 125 to select the recommended itinerary using the user preference model.

The use of a user preference model or traveler preference data structure may provide certain advantages over conventional filtering techniques. For example, the traveler preference data structure may represent the preferences of traveler 150 without requiring traveler 150 to explicitly select a preference along that preference dimension. Further, it allows for seemingly contradictory input to be incorporated.

For example, some obtained information may indicate a high sensitivity to price, but other information, e.g., subsequently obtained contextual information, may indicate the opposite. This may be reconciled using the traveler preference data structure by aggregating these pieces of information into a single data structure without requiring explicit filtering. Such preferences may be difficult or impossible to adequately address using mere adjustable filters. Accordingly, recommendation tool 110 and travel booking system 100 may provide an improved itinerary recommendation based on traveler 150's preferences. In certain embodiments recommendation engine 125 may cause the display of multiple recommended itineraries. For example, recommendation engine 125 may determine rankings of the itineraries using the traveler preference data structure and display a top number of itineraries to traveler 150 via client device 140. In this manner, recommendation tool 110 may present the best options to traveler 150 without overwhelming traveler 150 with a lengthy list of only semi-relevant itineraries.

Contextual information 102 may be obtained, for example, by the selections by traveler 150 of one or more preferred itineraries from sets of two or more itineraries presented to traveler 150. For example, recommendation tool 110 may present via client device 140 sets of itineraries matching the basic travel criteria of traveler 150, in certain embodiments. Traveler 150 may be prompted to select a subset, e.g., one or more of the itineraries, of the set. Based on the selection, recommendation tool 110 may infer a preference of the attributes of the selected itinerary over the attributes of the unselected itineraries. This preference may be inferred over a number of preference dimensions, at least some of which correspond to travel criteria. Accordingly, the selection by traveler 150 may provide contextual information 102, from which contextual information parser 120 may infer one or more travel criteria. This process may be repeated, creating additional contextual information 102 to parse. As described above, this contextual information may be used in conjunction with traveler preference information 101 to provide a dynamic and trip-specific travel itinerary recommendation to traveler 150. In this manner, contextual information may be generated by prompting a user to select from a set of itineraries, which can then be used in providing a recommendation to traveler 150.

Travel booking system 100 may use recommendation tool 110 to provide one or more recommended itineraries to display to traveler 150 using client device 140, in certain embodiments For example, recommendation tool 110 may first obtain information about traveler 150 from user profile server 130 and available travel products from travel products server 135 relevant to traveler 150's trip (e.g., based on the identity of traveler 150 and/or origin, destination, and dates of the trip). Recommendation tool 110 may then provide one or more sets of relevant itineraries to client device 140 and request that traveler 150 choose one or more preferred itineraries from each provided set. For example, traveler 150 may select only one preferred itinerary or may select a subset of the itineraries in the provided set. The selections made by traveler 150 may be used as contextual information and incorporated in the process of providing recommended itinerary 103. The recommended itineraries may be displayed on client device 140 such that traveler 150 may view the details of the itineraries and select one of the itineraries to book.

Using a list or set of available travel products, recommendation tool 110 may select a set of two or more itineraries from which traveler 150 may choose. In certain embodiments recommendation tool 110 may cause client device 140 to display a first set of two or more selected travel itineraries conforming to the trip conditions. For example, recommendation tool 110 may send information to client device 140 such that graphical user interface (GUI) 145*a* of client device 140 displays each of the itineraries of the set for traveler 150. This may include transferring data over a network 105, e.g., through the internet or other communications apparatus, which is interpreted and displayed on client device 140, e.g., by displaying images and/or text through a web browser or application. The display of each itinerary may include relevant information regarding each itinerary, e.g., price, amenities, number of connections, travel time, airline, check-in and check-out times, etc. Accordingly, traveler 150 may make an informed determination as to which itinerary or itineraries are most preferable of the presented set of itineraries.

Recommendation tool 110 may determine which itineraries to select to have displayed to traveler 150. For example, recommendation tool 110 may be configured based on a goal of choosing a set of itineraries that provides feedback, e.g., contextual information 102, from which traveler 150's preferences may be rapidly learned. In certain embodiments, the initial set of itineraries can be selected randomly. For example, if recommendation tool 110 is unable to obtain any prior information indicating the preferences of traveler 150, two random available itineraries may be selected to present. In some embodiments, the initial set of itineraries is based on information associated with traveler 150, e.g., to provide an initial set of itineraries that may confirm or test traveler 150's preferences or test a new or unknown dimension of his preferences.

Each itinerary may be associated with a preference in one or more preference dimensions, in certain embodiments. For example, each itinerary may be associated with parameters that are relatively high or low compared to the same parameters of other itineraries. As a specific example, each itinerary may have an associated price parameter (e.g., the price of a flight), connection parameter (e.g., the number of connections or indication that it is a direct flight), and one or more amenity parameters (e.g., inflight meals, WIFI, free checked baggage, etc.). Each of these parameters may correspond to a different preference dimension that may be modeled. Recommendation tool 110 may adjust a user preference model that includes one or more preference dimensions including a price sensitivity dimension, a connection sensitivity, and a comfort sensitivity. The two or more travel itineraries may be selected if they differ across at least one or more of the preference dimensions of the user model. Because there is a difference across at least one of the modeled dimensions, traveler 150's selection of one or more of the itineraries indicates a preference at a location(s) in the preference space where the selected itinerary is located as opposed to the locations of the unselected itineraries. This preference may be encoded in the user preference model by adjusting the user preference model based on the differences between the selected itinerary and the unselected itineraries. Accordingly, the selected itineraries may be selected to emphasize differences across each modeled preference dimension in the itineraries selected to include in the set presented to traveler 150.

It may be difficult to garner information across all of the relevant preference dimensions using only a single set of itineraries. Multiple sets of itineraries may be presented to traveler 150 to better model traveler 150's preferences, in certain embodiments. The previous selection(s) may influence subsequent selections of sets of two or more itineraries, in some embodiments. For example, a sequential Bayesian experimental design may be used for choosing sets of itineraries to display. As another example, an information gain-based criterion may be used to select subsequent sets of itineraries. The criterion may approximate the expected change in information gain between the traveler's preferences distribution before and after response to any set of itineraries. This may reduce the options for selecting the next set of itineraries, thereby increasing the probability of selecting a set that maximizes the information traveler 150's preferences. Alternatively, in some embodiments, the next set of itineraries may be chosen at random.

The selection of subsequent sets of itineraries may be optimized in different ways. For example, in certain embodiments, the next set of itineraries are chosen to display to traveler 150 based on a similarity or contrast with the current iteration of the user preference model. For example, if the current user preference model includes a current traveler price preference (Tpr), a current traveler connection preference (Tcn), and a current traveler comfort preference (Tcf), the next set of itineraries may be selected based on preferences Tpr, Tcn, Tcf, or some combination thereof. In some embodiments, a first itinerary to include in the next set of itineraries can be chosen due to its similarity with Tpr and Tcf and its contrast with Tcn, while a second itinerary to include in the next set can be chosen due to its contrast with Tpr, Tcn, and Tcf. This may be done to gain greater certainty of traveler 150's preference in a particular dimension, e.g., because of contradictory prior selections or lack of differences in that dimension in previous sets of itineraries.

Recommendation tool 110 may determine similarity and contrast in the modeled preference dimensions using any given technique. The similarity of two preference features may be determined by numerical distance between numerical representations of the given preference features, in certain embodiments. For example, if there is a preference threshold of Td, preference features of itineraries with a distance less than Td may be called similar and preference features with distance greater than Td may be called contrasting or dissimilar. In this manner, the selection of one itinerary over another may only impact a particular preference dimension if the difference along that dimension between the itineraries in the set is large, e.g., larger than the threshold. Conversely, these criteria may be used to determine which itineraries to include in the set, e.g., to select itineraries that have differences that exceed the threshold so that the selection by traveler 150's is a strong indicator of his preference in that dimension.

Certain embodiments may employ more complex calculations to represent the similarity and contrast between different itineraries. For example, recommendation tool 110 may use Cartesian coordinates on multi-dimensional planes, multivariate matrix arithmetic, or machine learned algorithms in selecting itineraries. In some embodiments, non-mathematical methods may, additionally or alternatively, be used, such as human expert selection curation. In some embodiments, a decision tree is employed to organize the sets of itineraries use to obtain traveler 150's preferences. The selections from sets of itineraries may be represent at decision nodes of the decision tree, and each node is associated with branches to other nodes from the selected itinerary. In certain embodiments, Information regarding selections along the decision tree from other pervious users. For example, each node of the decision tree may encode the weighted average of the user preference model created for each user that travelled that node during the selection process. Accordingly, even if traveler 150 quits selecting itineraries from subsequent sets, a preference model may be generated for traveler 150. As a specific example, if traveler 150 ends on node 1, recommendation tool 110 may use the lists of users associated with node 1 and aggregate the user preference model for traveler 150 based on the preferences of the listed users. Accordingly, the preferences of other users may be used to supplement the information used by recommendation tool 110 to determine recommended itinerary 103 for traveler 150.

The number of sets of itineraries provided to traveler 150 may be a predetermined value, such as a natural number n=1, 2, 3, . . . , in some embodiments. Recommendation tool 110 may continue to select and display sets of itineraries to traveler 150 until a predetermined or adjustable certainty level of traveler 150's preferences is exceeded or met. In this manner, recommendation tool 110 may obtain sufficient information to provide an accurate recommendation.

As described above, the selections by traveler 150 by client device 140 may include contextual information 102, which may be used to model the preferences of traveler 150. The model of traveler 150's preferences may be adjusted in a variety of ways based on the selected itinerary. As described earlier, each itinerary may have parameters representing different features, such as price, connections, amenities, etc. Each itinerary may be represented as a vector (or other suitable array or other data structure) with entries of the vector representing "scores" of each feature, in some embodiments. The "scores" may be determined relative to other itineraries, e.g., by normalizing over the range of that feature, e.g. the deviation of the price of the itinerary from a fixed value divided by the difference of the highest and lowest priced related itineraries or by including a binary entry for discrete itinerary options, such as WIFI or extra legroom. In this manner, the itineraries may be more easily manipulated by recommendation tool 110.

Each selection of an itinerary may correspond to an application of a transformation function to the current iteration of a data structure modeling traveler 150's preferences. For example, a function or matrix multiplication may be applied to the data structure, wherein the function or matrix multiplication is based on the vector of the selected itinerary (or itineraries) and/or the vector(s) of the unselected itineraries.

Recommendation tool 110 may associate a certainty value for each measured dimension based on the selections by traveler 150. The certainty values may be based on the number of selections completed, the relative differences between the itineraries on which the selections were made, the relative importance of the preference dimension, etc. A confidence or certainty determination may be made after each selection by traveler 150. This certainty information may be used to determine when to stop presenting additional sets of itineraries or which itineraries to include in the next set, thereby improving the recommendation process.

As described in this section, contextual information 102 may be obtained in several ways, including by explicit prompting traveler 150 to select a subset of presented itineraries, from which dynamic and trip-specific preferences may be inferred. The process may be repeated, creating additional contextual information 102 to parse. In this manner, contextual information 102 may be generated that reflects relevant travel preferences, which are used in providing recommended itinerary 103 to traveler 150.

As mentioned above, traveler 150 may use client device 140 to interface with travel booking system 100, including recommendation tool 110. For example, client device 140 may be communicatively coupled to recommendation tool 110 (and any other component of travel booking system 100)

over a network 105. Network 105 may be any suitable communication network or combination of communication networks such as to enable the transfer of information over suitable media between client device 140 and recommendation tool 110. In certain embodiments, client device 140 is any computing device including a graphical user interface (GUI) 145*a* and an input/output (I/O) interface 145*b*. Client device 140 may use GUI 145*a* to display or have displayed the recommended itinerary (or plurality of recommended travel itineraries). GUI 145*a* may be configured to receive input from traveler 150, such as by a touch screen of GUI 145*a* or through a keyboard/mouse interaction. In some embodiments, contextual information may be obtained by the interaction of traveler 150 with GUI 145*a* or any other interface of client device 140. For example, contextual information 102 about when traveler 150 is searching for travel products may be contextual information that is communicated or otherwise obtained by recommendation tool 110. As another example, explicitly provided information, such as a brief description of the trip, may be inputted and communicated over an interface of client device 140 via an interface. I/O interface 145*b* may enable the communication of contextual information, travel preference information, and recommendations to be communicated to and from client device 140 with recommendation tool 110. Further, I/O interface 145*b* may enable the communication of the decision to book a recommended itinerary by traveler 150. Client device 140 may be any suitable computing device comprising a combination of hardware and software, including a memory, one or more processors or processing circuitry, and interfaces (including GUI 145*a* and I/O interface 145*b*). For example, client device 140 may be a desktop computer, a laptop, a mobile phone, a tablet device, etc. In this manner, traveler 150 may interface with travel booking system 100 and receive a tailored recommended itinerary for traveler 150's trip.

As described above, recommendation tool 110 may use information obtained from sources other than traveler 150 and client device 140. For example, recommendation tool 110 may obtain information from user profile server 130 and travel products server 135. Each of these components may be communicatively coupled to recommendation tool over network 105. Network 105 may include any suitable connection or transmission media in which to provide communications between components of travel booking system 100. For example, network 105 may provide wired and/or wireless connection between various components.

User profile server 130 stores information related to traveler 150, according to certain embodiments. For example, user profile server 130 may store information regarding traveler 150's viewing history, ticketing history, browsing history, search patterns, mouse movement, keyboard usage of a traveler, etc. In some embodiments, user profile server 130 further stores information provided by traveler 150, such as information provided in setting up a profile. This information may be associated with traveler 150's general profile including gender, age, geographical location (e.g., zip code, city, state, country, etc.). In some embodiments, user profile server 130 stores other previously indicated preferences by traveler 150, such as price sensitivity, availability index, timing index, non-stop service index, or equipment type index. Such preferences may be indicated by traveler explicitly or implicitly. For example, traveler 150 may fill out a form indicating certain preferences or rate criteria when setting up their user profile. On the other hand, traveler 150 may indicate such preferences implicitly based on their past travel history or reviews of past travels. In certain embodiments, recommendation tool 110 may use the information stored in user profile server 130 as traveler preference information 101 to obtain one or more travel criteria associated with the trip. In some cases, the profile information may be used to generate a baseline preference data structure that is enhanced or adjusted by recommendation tool 110 using contextual information 102. Accordingly, recommendation tool 110 may use information accessed from user profile server 130 to enhance the accuracy of the recommended itineraries and reducing the expended processing to provide a confident recommendation.

Travel products server 135 may include one or more servers hosting travel product information. Travel products server 135 may include one or more databases storing types of data and/or information related to travel products that are searchable by the recommendation tool 110, in certain embodiments. For example, travel products server 135 may include one or more airline reservation databases, hotel reservation databases and/or car rental reservation databases. The airline reservation databases may store information about flight travel products, including flight number, origin, destination, schedule, price, amenities, etc. Similarly, the hotel reservation databases may store information regarding available hotel bookings, including location, price, room-type, amenities, etc. Likewise, the car rental reservation databases may store information regarding car rental travel products, including information regarding the price, pick-up/drop-off options, car types, etc. In this manner, travel products server 135 may make available all relevant travel products to traveler 150's trip for analysis by recommendation tool 110. Some or all of the databases may be managed by a global distribution system (GDS), according to some embodiments. Although the travel products server 135 and user profile server 130 are both illustrated external to recommendation tool 110, those of ordinary skill in the art will understand that each of the servers or parts or components thereof may also be integrated with portions of recommendation tool 110 or other components of travel booking system 100 or integrated together.

The term "server" and/or "servers" or any other reference to a "server" may refer to any suitable combination of hardware and/or software, such as memory and control logic, for storing, accessing, retrieving, and communicating various types of information, for example, user profile and travel product information. Although the disclosure herein refers to user profile server 130 and travel products servers 135, travel booking system 100 may utilize any suitable server or database implemented thereon that may store information used in providing a recommended itinerary to traveler 150, as described above. One or more of user profile server 130 and travel products servers 135 may include any suitable combination of volatile or non-volatile, local or remote devices suitable for storing and maintaining information. For example, the one or more of user profile server 130 and travel products servers 135 may include random access memory (RAM), read only memory (ROM), solid state storage devices, magnetic storage devices, optical storage devices, or any other suitable information storage device or a combination of such devices.

Servers contemplated for use in travel booking system 100, including user profile server 130 and travel products servers 135, may be implemented in any suitable manner. As an example, each of user profile server 130 and travel products servers 135 may be implemented as a single server, as multiple servers, as a server distributed over multiple locations, as one or more virtualized servers (e.g., implemented on the cloud), or provided as a service. Additionally, servers described herein may be implemented using hardware, software, or any suitable combination thereof. For example, one or more servers used with travel booking system 100 may be implemented as a database using software only. As another example, the servers described herein may be implemented using hardware physically located in one or more locations. Furthermore, servers described herein may share one or more hardware or software elements with other servers, including servers not owned or controlled by the same entity implemented travel booking system 100. Accordingly, the terms "server" and "servers" as referenced herein, e.g., as user profile sever 130 and travel products severs 135, may refer to any suitable apparatus or implementation of software that may provide access to the information used by travel booking system 100.

FIG. 2 illustrates an implementation of recommendation tool 110, in accordance with certain embodiments. Recommendation tool 110 may be implemented by any suitable combination of hardware and software. In certain embodiments, recommendation tool may be implemented with processor(s) 111, memory 112, and interfaces 113. Recommendation tool 110 may be configured in the illustrated configuration or in any other suitable configuration.

Interfaces 113 are configured to enable wired and/or wireless communications. Interfaces 113 are configured to communicate data between components of travel booking system 100, such as user profile server 130 and travel products server 135, client device 140, and network 105. In some embodiments, interfaces 113 include user profile server interface 230, travel products server interface 235, client device interface 240, and network interface 205, each coupled to their respective component. Interfaces 230, 235, 240, 205 may be implemented as separate interfaces and/or implemented sharing interface hardware in any suitable manner to provide communications between recommendation tool 110 and the respective components of travel booking system 100. In some embodiments, interfaces 113 may include a WIFI interface, a local area network (LAN) interface, a wide area network (WAN) interface, a modem, a switch, and/or a router. Processor(s) 111 may be configured to send and receive data using any of interfaces 113. Interfaces 113 may be configured to use any suitable type of communication protocol as would be appreciated by one of ordinary skill in the art.

Memory 112 comprises one or more disks, tape drives, or solid-state drives, and may be used as an over-flow data storage device, to store programs when such programs are selected for execution, and to store instructions and data that are read during program execution. Memory 112 may be volatile or non-volatile and may comprise read-only memory (ROM), random-access memory (RAM), ternary content-addressable memory (TCAM), dynamic random-access memory (DRAM), and static random-access memory (SRAM). Memory 112 is operable to store instructions for obtaining traveler preference information, inferring travel criteria from contextual information, determining a recommended travel itinerary for the trip to the traveler based on the travel preference information and the contextual information, and/or any other data or instructions that may be used to carry out the functions and processing described herein. The instructions in memory 112 may include any suitable set of instructions, logic, rules, or code operable to execute traveler monitor 115, contextual information parser 120, and recommendation engine 125. Additionally, memory 112 may be operable to store other information used or generated by recommendation tool 110. For example, memory 112 may be configured to store data 210, which may include traveler preference information 210a, travel criteria 210b, contextual information 210c, traveler preference array 210d (e.g., data representing the modeled/calculated preferences of the traveler), travel products 210e, recommendations 210f, and any other information or data used by recommendation tool 110 to carry out the functions described herein.

Processor 111 comprises one or more processors operably coupled to the memory 112 and/or interfaces 113. Processor 111 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). Processor 111 may be a programmable logic device, a microcontroller, a microprocessor, or any suitable combination of the preceding. Processor 111 is communicatively coupled to and in signal communication with the memory 112 and/or interfaces 113. The one or more processors are configured to process data and may be implemented in hardware or software. For example, processor 111 may be 8-bit, 16-bit, 32-bit, 64-bit or of any other suitable architecture. Processor 111 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors of processor(s) 111 are configured to implement various instructions. For example, the one or more processors are configured to execute instructions to implement traveler monitor 115, contextual information parser 120, and recommendation engine 125. In this way, processor 111 may be a special purpose computer designed to implement function disclosed herein. In some embodiments, traveler monitor 115, contextual information parser 120, and recommendation engine 125 are each implemented using logic units, FPGAs, ASICs, DSPs, or any other suitable hardware.

FIG. 3 illustrates a flowchart diagram of an example method 300 for recommending a travel itinerary to a traveler, in accordance with certain embodiments. Method 300 may begin at step 310, wherein traveler preference information associated with a traveler is obtained. The traveler preference information indicates one or more travel criteria for a trip. For example, the travel criteria include one or more parameters of the travel products available for the trip. As a particular example, the traveler may indicate certain itinerary requirements, such as the origin, destination, travel dates, price range, etc. These parameters may be used to determine which travel products conform with the user's preferences. In one example, the traveler preference information may be obtained by traveler monitor 115 of recommendation information, e.g., from user profile server 130 and/or client device 140.

At step 320, one or more travel criteria are inferred from contextual information obtained for the trip. The contextual information does not include any travel criterion. For example, the contextual information may be any type of contextual information, such as one of the types of contextual information described above. The contextual information may be any information that does not include a travel criterion, such as: information associated with the location of the traveler or the time at which the traveler is seeking a travel itinerary for the trip; information associated with a destination of the trip; a reason for the trip or an indication that the traveler is travelling with a group or alone; or information associated with a state of mind of the traveler. Some or all of the contextual information may be obtained from the user's interaction with travel booking system 100, either via explicit feedback, e.g., in response to prompting by travel booking system 100, or implicitly, e.g., using meta data associated with the user's session with travel booking system 100. The contextual information may be obtained by monitoring traveler 150's activity on travel booking system 100 and/or by recommendation tool 110 querying external systems to retrieve contextual information based on other information, e.g., explicitly provided travel criteria or profile information from user profile server 130, according to certain embodiments. Accordingly, in one example, contextual information parser 120 of recommendation tool 110 may parse the contextual information to infer travel criteria. Contextual information parser 120 may use previous travel bookings to determine the relationship between types of contextual information and travel criteria. The relationships or correlations on which the parsing is based may be explicitly defined, e.g., according to a predetermined table or data structure, in certain embodiments.

At step 330, a recommended travel itinerary is determined for the trip to the traveler based on the travel preference information and the contextual information. For example, the recommended travel itinerary may be the itinerary that most closely aligns with the user's preferences, which may be determined based on the travel preference information and the contextual information. As an example, a user preference model may be created that incorporates the preferred features of itineraries for the trip, wherein the features are informed by the travel criteria, including those inferred from contextual information. In a particular implementation, recommendation engine 125 of recommendation tool 110 may use a preference model based on the obtained traveler preference information 101 and the parsed contextual information 102 to select the recommended itinerary, such as recommended itinerary 103.

At step 340, the recommended travel itinerary is displayed to the traveler. Displaying the recommended travel itinerary allows the traveler to review travel criteria associated with the recommended travel itinerary and select the recommended travel itinerary for booking the trip. For example, the recommended travel itinerary may be transmitted to and displayed on a user device of the user, e.g., his phone or computer. For instance, recommendation tool 110 may cause recommended itinerary 103 to be displayed to traveler 105 via client device 140, e.g., through GUI 145a. As a result, method 300 provided the user with a recommended travel itinerary using contextual information that previously was ignored.

Method 300 may include more or fewer steps and/or one or more substeps, in accordance with certain embodiments. For example, determining the recommended travel itinerary for the trip includes the substep of generating a traveler preference data structure for the trip. The traveler preference data structure is based on the travel criteria indicated by the traveler preference information and the travel criteria inferred from the contextual information. Determining the recommended travel itinerary further includes the sub step of applying the traveler preference data structure to the travel products available for the trip. In this manner, a more robust calculation may be used in recommending a travel itinerary. Further, the traveler preference data structure may allow for the a more wholistic determination of the recommended itinerary by allowing weighting across various preference dimensions to be used to compare travel products to select the best (or most likely to be preferred) itinerary.

Additionally, method 300 may include any suitable step to carry out any of the described functions of travel booking system 100 and/or recommendation tool 110. And, while certain components of travel booking system 100 and/or recommendation tool 110 may have been described as carrying out one or more steps of method 300 or therein referenced, any suitable system or components thereof may be used to carry out the various steps of the methods described herein.

In addition, techniques, systems, subsystems, and methods described and illustrated in the various embodiments as discrete or separate may be combined or integrated with other systems, modules, techniques, or methods without departing from the scope of the present disclosure. Other items shown or described as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A computerized travel system, comprising:
a first server configured to store information associated with travelers previously using the travel system; and
a travel itinerary recommendation tool communicatively coupled to the first server, one or more second servers configured to store one or more travel products available through the travel system, and a client device, wherein the travel itinerary recommendation tool is configured to apply machine learned algorithms to identify user preferences through a series of itinerary sets selected based on their ability to inform a plurality of travel preferences of the user and encode the identified user preferences in a traveler preference data structure comprising an array of values, the travel itinerary recommendation tool comprising:
a traveler monitor configured to obtain traveler preference information associated with a traveler from one or more of the first server and the client device, wherein the traveler preference information indicates one or more travel criteria for a trip, wherein the one or more travel criteria comprises one or more parameters of the one or more available travel products;
a contextual information parser configured to infer in real-time one or more travel criteria from contextual information obtained for the trip, wherein the contextual information does not comprise travel criterion and instead comprises information related to at least one selection from sets of two or more itineraries presented to the traveler; and
a recommendation engine configured to:
create a first array corresponding to a first available travel product, the first array storing one or more values associated with travel product features of the first available travel product;
create a second array corresponding to a second available travel product, the second array storing one or more values associated with travel product features of the second available travel product;
dynamically update the traveler preference data structure for the trip by:
compiling, for each of the travel criterion, one or more indications based on one or more of the traveler preference information, the contextual information inferred in real-time, and one or more preferences of at least one associated user;
determining, for each of the travel criterion, an updated preference value representative of the one or more indications compiled for the travel criterion, wherein;
at least one of the one or more indications is adjusted by a weighting factor indicating an approximated strength of correlation between the contextual information and a particular one of the inferred travel criterion; and
populating the array with each determined updated preference value;
compare the updated traveler preference data structure to the first array, wherein comparing the updated traveler preference data structure comprises:
for each travel criterion in the updated traveler preference data structure, determining a distance between the determined updated preference value and one or more values in the first array associated with one or more corresponding parameters;
comparing the determined distances to a set preference threshold;
identifying a first contrasting number representing a number of travel criterion wherein the determined distance is greater than the set preference threshold; and
identifying a first similar number representing a number of travel criterion wherein the determined distance is less than the set preference threshold;
compare the updated traveler preference data structure to the second array, wherein comparing the comparing the updated traveler preference data structure comprises:
for each travel criterion in the updated traveler preference data structure, determining a distance between the determined updated preference value and one or more values in the second array associated with one or more corresponding parameters;
comparing the determined distances to the set preference threshold;
identifying a second contrasting number representing a number of travel criterion wherein the determined distance is greater than the set preference threshold; and
identifying a second similar number representing a number of travel criterion wherein the determined distance is less than the set preference; and
determine a likelihood that each of the first travel product and second travel product will be preferred based on the comparisons of the updated traveler preference data structure with the first array and the second array;
select a first recommended travel itinerary based at least on the determined likelihoods, the first contrasting number, the first similar number, the second contrasting number, and the second similar number, wherein:
the first recommended travel itinerary is associated with the first available travel product and the first contrasting number is greater than the second contrasting number;

cause a display of the first recommended travel itinerary to the traveler at the client device, wherein displaying the first recommended travel itinerary allows the traveler to review travel criteria associated with the first recommended travel itinerary and select the first recommended travel itinerary for planning the trip using the client device.

2. The travel system of claim 1, wherein selecting the first recommended travel itinerary is also based on a determination of a closest travel product of the one or more available travel products that has a least deviation from the updated traveler preference data structure.

3. The travel system of claim 1, wherein the one or more second servers are configured to store travel products comprising one or more of airline flights, hotel rooms, car rentals, and attractions.

4. A computerized method for use in a travel itinerary system, comprising:

applying machine learned algorithms to identify user preferences through a series of itinerary sets selected based on their ability to inform a plurality of travel preferences of the user and encode the identified user preferences in a traveler preference data structure comprising an array of values;

obtaining, by a computer, traveler preference information associated with a traveler, wherein the traveler preference information indicates one or more travel criteria for a trip, wherein travel criteria comprises one or more parameters of travel products available for the trip;

inferring in real-time, by a computer, one or more travel criteria from contextual information obtained for the trip, wherein the contextual information does not comprise travel criterion and instead comprises information related to at least one selection from sets of two or more itineraries presented to the traveler;

creating a first array corresponding to a first available travel product, the first array storing one or more values associated with travel product features of the first available travel product;

creating a second array corresponding to a second available travel product, the second array storing one or more values associated with travel product features of the second available travel product;

dynamically updating the traveler preference data structure for the trip by:

compiling, for each of the travel criterion, one or more indications based on the traveler preference information, the contextual information inferred in real-time, and one or more preferences of at least one associated user;

determining, for each of the travel criterion, an updated preference value representative of the one or more indications and a weighting factor, wherein:

at least one of the one or more indications is adjusted by a weighting factor indicating an approximated strength of correlation between the contextual information and a particular one of the inferred travel criterion; and populating the array with each determined updated preference value;

comparing the updated traveler preference data structure to the first array, wherein comparing the updated traveler preference data structure comprises:

for each travel criterion in the updated traveler preference data structure, determining a distance between the determined updated preference value and one or more values in the first array associated with one or more corresponding parameters;

comparing the determined distances to a set preference threshold;

identifying a first contrasting number representing a number of travel criterion wherein the determined distance is greater than the set preference threshold; and identifying a first similar number representing a number of travel criterion wherein the determined distance is less than the set preference threshold;

comparing the updated traveler preference data structure to the second array, wherein comparing the comparing the updated traveler preference data structure comprises:

for each travel criterion in the updated traveler preference data structure, determining a distance between the determined updated preference value and one or more values in the second array associated with one or more corresponding parameters;

comparing the determined distances to the set preference threshold;

identifying a second contrasting number representing a number of travel criterion wherein the determined distance is greater than the set preference threshold; and identifying a second similar number representing a number of travel criterion wherein the determined distance is less than the set preference;

determining a likelihood that each of the first travel product and second travel product will be preferred based on the comparisons of the updated traveler preference data structure with the first array and the second array;

selecting a first recommended travel itinerary based at least on the determined likelihoods, the first contrasting number, the first similar number, the second contrasting number, and the second similar number, wherein:

the first recommended travel itinerary is associated with the first available travel product and the first contrasting number is greater than the second contrasting number;

causing, by a computer, a display of the recommended travel itinerary to the traveler, wherein displaying the recommended travel itinerary allows the traveler to review travel criteria associated with the recommended travel itinerary and select the recommended travel itinerary for planning the trip.

5. The method of claim 4, further comprising obtaining, by a computer, at least some of the contextual information from the traveler's interaction with the travel itinerary system, wherein the obtained contextual information is not explicitly provided by the traveler.

6. The method of claim 4, wherein inferring the one or more travel criteria in real-time comprises obtaining information indicating relationships between contextual information and travel criteria, wherein the obtained information was generated based on prior trips booked by the traveler or other users of the travel itinerary planning system.

7. The method of claim 4, wherein updating the travel preference data structure for the trip comprises adjusting the one or more determined values based on the inferred travel criteria from the contextual information.

8. The method of claim 4, wherein selecting the first recommended travel itinerary is also based on a determination of a closest travel product of the one or more available travel products that has a least deviation from the updated traveler preference data structure.

9. The method of claim 4, wherein the contextual information comprises one or more of the following types of information: information associated with the location of the traveler or the time at which the traveler is seeking a travel itinerary for the trip; information associated with a destination of the trip; a reason for the trip or an indication that the traveler is travelling with a group or alone; and information associated with a state of mind of the traveler.

10. The method of claim 4, wherein at least a portion of the contextual information is obtained by presenting a plurality of sets of travel itineraries to the traveler and obtaining the traveler's selections of preferred subsets of each of the plurality of travel itineraries.

11. A computerized travel itinerary recommendation tool configured to apply machine learned algorithms to identify user preferences through a series of itinerary sets selected based on their ability to inform a plurality of travel preferences of the user and encode the identified user preferences in a traveler preference data structure comprising an array of values, wherein the travel itinerary recommendation tool comprises:

a traveler monitor configured to obtain traveler preference information associated with a traveler, wherein the traveler preference information indicates one or more travel criteria for a trip, wherein travel criteria comprises one or more parameters of travel products available for the trip;

a contextual information parser configured to infer in real-time one or more travel criteria from contextual information obtained for the trip, wherein the contextual information does not comprise travel criterion, and instead comprises information related to at least one selection from sets of two or more itineraries presented to the traveler;

a recommendation engine configured to:

create a first array corresponding to a first available travel product, the first array storing one or more values associated with travel product features of the first available travel product;

create a second array corresponding to a second available travel product, the second array storing one or more values associated with travel product features of the second available travel product;

dynamically update the traveler preference data structure for the trip by:

compiling, for each of the travel criterion, one or more indications based on the traveler preference information, the contextual information inferred in real-time, and one or more preferences of at least one associated user;

determining, for each of the travel criterion, an updated preference value representative of the one or more indications and a weighting factor, wherein:

at least one of the one or more indications is adjusted by a weighting factor indicating an approximated strength of correlation between the contextual information and a particular one of the inferred travel criterion; and populating the array with each determined updated preference value;

compare the updated traveler preference data structure to the first array corresponding to one of the available travel products, wherein comparing the updated traveler preference data structure comprises:

for each travel criterion in the updated traveler preference data structure, determining a distance between the determined updated preference value and one or more values in the first array associated with one or more corresponding parameters;

comparing the determined distances to a set preference threshold;

identifying a first contrasting number representing a number of travel criterion wherein the determined distance is greater than the set preference threshold; and identifying a first similar number representing a number of travel criterion wherein the determined distance is less than the set preference threshold;

comparing the updated traveler preference data structure to the second array, wherein comparing the comparing the updated traveler preference data structure comprises:

for each travel criterion in the updated traveler preference data structure, determining a distance between the determined updated preference value and one or more values in the second array associated with one or more corresponding parameters;

comparing the determined distances to the set preference threshold;

identifying a second contrasting number representing a number of travel criterion wherein the determined distance is greater than the set preference threshold; and identifying a second similar number representing a number of travel criterion wherein the determined distance is less than the set preference;

determine a likelihood that each of the first travel product and second travel product will be preferred based on the comparisons of the updated traveler preference data structure with the first array and the second array;

select a recommended travel itinerary based at least on the determined likelihoods, the comparison of the updated traveler preference data structure to the second array, the first contrasting number, the first similar number, the second contrasting number, and the second similar number, wherein:

the first recommended travel itinerary is associated with the first available travel product and the first contrasting number is greater than the second contrasting number;

cause a display of the recommended travel itinerary to the traveler, wherein displaying the recommended travel itinerary allows the traveler to review travel criteria associated with the recommended travel itinerary and select the recommended travel itinerary for planning the trip.

12. The computerized travel itinerary recommendation tool of claim 11, wherein the traveler monitor is further configured to obtain at least some of the contextual information from the traveler's interaction with a travel itinerary planning system associated with the travel itinerary recommendation tool, wherein the obtained contextual information is not explicitly provided by the traveler.

13. The computerized travel itinerary recommendation tool of claim 11, wherein inferring one or more travel criteria comprises obtaining information indicating relationships between contextual information and travel criteria, wherein the obtained information was generated based on prior trips booked by the traveler or other users of the travel itinerary planning system.

14. The computerized travel itinerary recommendation tool of claim 11, wherein updating the travel preference data structure for the trip comprises adjusting the one or more determined values based on the inferred travel criteria from the contextual information.

15. The computerized travel itinerary recommendation tool of claim 11, wherein selecting the first recommended travel itinerary is also based on a determination of a closest travel product of the one or more available travel products that has a least deviation from the updated traveler preference data structure.

16. The computerized travel itinerary recommendation tool of claim 11, wherein the contextual information comprises one or more of the following types of information: information associated with the location of the traveler or the time at which the traveler is seeking a travel itinerary for the trip; information associated with a destination of the trip; a reason for the trip or an indication that the traveler is travelling with a group or alone; and information associated with a state of mind of the traveler.

17. The computerized travel itinerary recommendation tool of claim 11, wherein the recommendation tool is configured to obtain contextual information by presenting a plurality of sets of travel itineraries to the traveler and obtaining the traveler's selections of preferred subsets of each of the plurality of travel itineraries.

18. The computerized travel system of claim 1, wherein:
the contextual information parser is further configured to:
    determine a first certainty value indicating a correlation between the contextual information and a first inferred travel criterion;
    after receiving new contextual information, update the first certainty value; and
the recommendation engine is further configured to:
    update the traveler preference data structure by determining, for the first inferred travel criterion, a value representative of one or more indications corresponding to the first inferred travel criterion as adjusted by a first weighting factor representing the updated certainty value;
    apply the updated traveler preference data structure to determine a second recommended travel itinerary.

\* \* \* \* \*